US00RE39501E

(19) United States
(12) Reissued Patent
Minami et al.

(10) Patent Number: US RE39,501 E
(45) Date of Reissued Patent: Mar. 6, 2007

(54) MULTIPLE NETWORK PROTOCOL ENCODER/DECODER AND DATA PROCESSOR

(75) Inventors: John Shigeto Minami, Honolulu, HI (US); Ryo Koyama, Palo Alto, CA (US); Michael Ward Johnson, Livermore, CA (US); Masaru Shinohara, Fremont, CA (US); Thomas C. Poff, Santa Clara, CA (US); Daniel F. Burkes, San Francisco, CA (US)

(73) Assignee: NVIDIA Corporation, Santa Clara, CA (US)

(21) Appl. No.: 10/093,340

(22) Filed: Mar. 6, 2002

Related U.S. Patent Documents

Reissue of:
(64) Patent No.: 6,034,963
Issued: Mar. 7, 2000
Appl. No.: 08/742,085
Filed: Oct. 31, 1996

(51) Int. Cl.
*G06F 13/00* (2006.01)
*G06F 15/16* (2006.01)

(52) U.S. Cl. ..... 370/401; 370/466; 709/230; 710/105

(58) Field of Classification Search ..... 370/389, 370/395.1, 392, 401, 420, 465, 466, 467, 370/469; 709/223, 224, 230, 232, 237; 710/105; 711/117, 118
See application file for complete search history.

(56) References Cited

U.S. PATENT DOCUMENTS 5,012,489 A * 4/1991 Burton et al. ..... 375/8
5,161,193 A * 11/1992 Lampson et al. ..... 380/49

(Continued)

OTHER PUBLICATIONS

G. Chesson, et al.; *XTP–Protocol Engine VLSI for Real–Time LANs*; 1988; EFOC/LAN–88: The Sixth European Fibre Optic Communications and Local Area Networks Exposition.

Greg Chesson; *The Protocol Engine*; Sep. 1987; UNIX Review.

(Continued)

*Primary Examiner*—Alpus H. Hsu
(74) *Attorney, Agent, or Firm*—Silicon Valley IP Group, PC; Kevin J. Zilka

(57) ABSTRACT

A multiple network protocol encoder/decoder comprising a network protocol layer, data handler, O.S. State machine, and memory manager state machines implemented at a hardware gate level. Network packets are received from a physical transport level mechanism by the network protocol layer state machine which decodes network protocols such as TCP, IP, User Datagram Protocol (UDP), PPP, and Raw Socket concurrently as each byte is received. Each protocol handler parses and strips header information immediately from the packet, requiring no intermediate memory. The resulting data are passed to the data handler which consists of data state machines that decode data formats such as email, graphics, Hypertext Transfer Protocol (HTTP), Java, and Hypertext Markup Language (HTML). Each data state machine reacts accordingly to the pertinent data, and any data that are required by more than one data state machine is provided to each state machine concurrently, and any data required more than once by a specific data state machine, are placed in a specific memory location with a pointer designating such data (thereby ensuring minimal memory usage). Resulting display data are immediately passed to a display controller. Any outgoing network packets are created by the data state machines and passed through the network protocol state machine which adds header information and forwards the resulting network packet via a transport level mechanism.

44 Claims, 14 Drawing Sheets

U.S. PATENT DOCUMENTS

| | | | | | |
|---|---|---|---|---|---|
| 5,303,344 | A | | 4/1994 | Yokoyama et al. | 395/200 |
| 5,307,413 | A | * | 4/1994 | Denzer | 380/49 |
| 5,426,694 | A | * | 6/1995 | Hebert | 379/242 |
| 5,430,727 | A | * | 7/1995 | Callon | 370/85.13 |
| 5,440,551 | A | * | 8/1995 | Suzuki | 370/60 |
| 5,495,480 | A | | 2/1996 | Yoshida | 370/389 |
| 5,499,353 | A | * | 3/1996 | Kadlec et al. | 395/445 |
| 5,519,704 | A | * | 5/1996 | Farinacci et al. | 370/85.13 |
| 5,546,453 | A | * | 8/1996 | Hebert | 179/242 |
| 5,566,170 | A | | 10/1996 | Bakke | 370/392 |
| 5,577,105 | A | * | 11/1996 | Baum et al. | 379/93 |
| 5,577,172 | A | | 11/1996 | Vatland | 358/1.15 |
| 5,577,237 | A | | 11/1996 | Lin | 713/500 |
| 5,598,410 | A | | 1/1997 | Stone | 370/469 |
| 5,619,650 | A | | 4/1997 | Bach | 709/246 |
| 5,625,678 | A | * | 4/1997 | Blomfield-Brown | 379/93 |
| 5,625,825 | A | | 4/1997 | Rostoker | 710/242 |
| 5,634,015 | A | | 5/1997 | Chang | 710/310 |
| 5,636,371 | A | * | 6/1997 | Yu | 395/500 |
| 5,640,394 | A | * | 6/1997 | Schrier et al. | 370/389 |
| 5,663,951 | A | | 9/1997 | Danneels | 370/230 |
| 5,666,362 | A | * | 9/1997 | Chen et al. | 370/420 |
| 5,675,507 | A | * | 10/1997 | Bobo, II | 364/514 R |
| 5,687,314 | A | | 11/1997 | Osman | 714/49 |
| 5,696,899 | A | | 12/1997 | Kalwitz | 709/228 |
| 5,699,350 | A | | 12/1997 | Kraslavsky | 370/254 |
| 5,701,316 | A | | 12/1997 | Alferness | 714/807 |
| 5,727,149 | A | | 3/1998 | Hirata | 709/250 |
| 5,734,865 | A | * | 3/1998 | Yu | 395/500 |
| 5,748,905 | A | * | 5/1998 | Hauser et al. | 395/200.79 |
| 5,754,540 | A | * | 5/1998 | Liu et al. | 370/315 |
| 5,761,281 | A | * | 6/1998 | Baum et al. | 379/93.29 |
| 5,790,546 | A | * | 8/1998 | Dobbins et al. | 370/400 |
| 5,790,676 | A | * | 8/1998 | Ganesan et al. | 380/23 |
| 5,802,278 | A | * | 9/1998 | Isfeld et al. | 395/200.02 |
| 5,802,287 | A | * | 9/1998 | Rostoker et al. | 395/200.8 |
| 5,802,306 | A | * | 9/1998 | Hunt | 395/200.58 |
| 5,805,816 | A | | 9/1998 | Picazo | 709/223 |
| 5,809,235 | A | * | 9/1998 | Sharma et al. | 395/200.6 |
| 5,815,516 | A | | 9/1998 | Aaker | 714/807 |
| 5,818,935 | A | * | 10/1998 | Maa | 380/20 |
| 5,826,032 | A | | 10/1998 | Finn | 709/236 |
| 5,870,549 | A | * | 2/1999 | Bobo, II | 395/200.36 |
| 5,872,919 | A | | 2/1999 | Wakeland | 709/230 |
| 5,894,557 | A | * | 4/1999 | Bade et al. | 395/200.58 |
| 5,909,546 | A | | 6/1999 | Osborne | 709/212 |
| 5,920,732 | A | | 7/1999 | Riddle | 710/56 |
| 5,935,268 | A | | 8/1999 | Weaver | 714/758 |
| 5,937,169 | A | | 8/1999 | Connery | 709/250 |
| 5,941,988 | A | | 8/1999 | Bhagwat | 713/201 |
| 5,943,481 | A | | 8/1999 | Wakeland | 709/230 |
| 5,974,518 | A | | 10/1999 | Nogradi | 711/173 |
| 5,999,974 | A | | 12/1999 | Ratcliff | 709/224 |
| 6,014,699 | A | | 1/2000 | Ratcliff | 709/224 |
| 6,061,742 | A | | 5/2000 | Stewart | 709/250 |
| 6,076,115 | A | | 6/2000 | Sambamurthy | 709/250 |
| 6,081,846 | A | | 6/2000 | Hyder | 709/250 |
| 6,092,110 | A | | 7/2000 | Maria | 709/225 |
| 6,092,229 | A | | 7/2000 | Boyle | 714/748 |
| 6,098,188 | A | | 8/2000 | Kalmanek | 714/746 |
| 6,101,543 | A | | 8/2000 | Alden | 709/229 |
| 6,151,625 | A | | 11/2000 | Swales | 709/218 |
| 6,157,955 | A | | 12/2000 | Narad | 709/228 |
| 6,172,980 | B1 | | 1/2001 | Flanders | 370/401 |
| 6,172,990 | B1 | | 1/2001 | Deb | 370/474 |
| 6,173,333 | B1 | | 1/2001 | Jolitz | 709/240 |
| 6,182,228 | B1 | | 1/2001 | Boden | 713/201 |
| 6,230,193 | B1 | * | 5/2001 | Arunkumar et al. | 709/218 |

OTHER PUBLICATIONS

Greg Chesson; *Protocol Engine Design*; Proceedings of the Summer 1987 USENIX Conference.

Girish P. Chandranmenon and George Varhese; *Trading Packet Headers for Packet Processing*; IEEE/ACM Transactions on Networking; vol. 4; Apr. 1996.

Kjersti Moldeklev, Espen Klovning, and Oivind Kure; *The Effect of End System Hardware and Software on TCP/IP Throughout Performance Over a Local ATM Network*.

William S. Marcus, Ilija Hadzic, Anthony J. McAully, and Jonathan M. Smith; *Protocol Boosters: Applying Programmability to Network Infrastructures*; IEEE Communications Magazine; Oct. 1998.

Deborah F. Kornblum; *Protocol Implementation and Other Performance Issues for Local and Metropolitan Area Networks*; IEEE; 1988.

David C. Feldmei;er, Anthony McAuley, Jonathan M. Smith, Deborah S. Bakin, William S. Marcus, and Thomas M. Raleigh; *Protocol Boosters*; IEEE Journal on Selected Areas in Communications, vol. 16, No. 3; Apr. 1998.

P. Camarda, F. Pipio, and G. Piscitelli; *Performance Evaluation of TCP/IP Protocol Implementations in End Systems*; IEEE Proc.–Computing Digit. Tech., vol. 146, No. 1, Jan. 1999.

Peter Druschel, Mark B. Abbott, Michael a. Pagels, and Larry L. Peterson; *Network Subsystem Design*; IEEE Network; Jul. 1993.

Mohammad Mansour and Ayman Kayssi; *FPGA–Based Inernet Protocol Version 6 Router*, 1998 IEEE.

Piyush Shivam; Pete Wyckoff; Dhableswar Panda; *EMP: Zero–Coopy OS–Bypass NIC–Driven Gigabit Ethernet Message Passing*; SC 2001; Nov. 2001.

Fed Eady; *Embedded Internet Part 2: TCP/IP and a 16–Bit Compiler*, Embedded PC; Jun. 1999.

F. Mora, and A. Sebastia; *Electronic Design of a High Performance Interface to thje SCI Network*, IEEE 1998.

Chan Kim, Jong–Arm Jun, Kyou–Ho Lee, Hyup–Jong Kim; *Design and Implementation of an ATM Segmentation Engine with PCI Interface*; IEEE 1998.

Chan Kim, Jong–Arm Jun, Yeong–Ho Park, Kyu–Ho Lee, Hyup–Jong Kim; *Design and Implementation of a High–Speed ATM Host Interface Controller*.

S. Varada, Y. Yang, and D. Evans; *Data and Buffer Management in ATM Systems*.

Kenneth G. Yocum; Jeffery S. Chase, Andrew J. Gallatin, and Alvin R. Lebeck; *Cut–Through Delivery in Trapeze: An Exercise in Low–Latency Messaging*, 1997 IEEE.

George Orphano, Alexios Birbas, Nikos Petrellis, Ionnis Moutzouris, Andreas Malataras, Angus Goldfinch, John Brosnan, and Uros Janko; *Compensating for Moderate Effective Throughput at the Desktop*; IEEE communications Magazine; Apr. 2000.

John Legg; *Choosing and Implementing an Embedded TCP/IP Stack*; Electronic Product Design Jan. 1999.

Richard Ames; *Building an Embedded Web Server from Scratch*; Circuit Cellar INK; Issue 91; Feb. 1998.

Ronald P. Luijten; *An OC–12 ATM Switch Adapter Chipset*; 1998 IEEE.

W.K. Giloi and P. Behr; *AN IPC Protocol and its Hardware Realization for a High–Speed Distributed Multicomputer System*; 1981 IEEE.

Pankaj Gupta and Nick McKeown; *Algorithms for Packet Clasification*; IEEE Network; Mar./Apr. 2001.

Peter a. Steenkiste; *A Systematic Approach to Host Interface Design for High–Speed Networks*; IEEE Mar. 1994.
Larry D. Wittie and Fanyuan Ma; *A TCP/IP Communication Subsystem in Micros*; 1987 IEEE.
Lucas Womack, Ronald Mraz, and Abraham Mendelson; *A study of Virtual Memory MTU Reassembly Within the PowerPC Architecture*; 1997 IEEE.
Gr.A. Doumenis, G.E. Konstantoulakis, D.I. Reisis, G.I. Stassinopoulos; *A Personal Computer Hosted Terminal Adapter for the Braodband Integrated Services Digital Network and Applications*.
Michael J.K. Nielsen; *TURBOchannel*; 1991 IEEE.
Hemant Kanakia, and David R. Cheriton; *The VMP Netwrok Adapter Board (NAB) High–Performance Network Communication for Multiprocessors*; 1988 ACM.
Zubin D. Dittia, Guru M. Parulkar, and Jerome R. Cox, Jr.; *The APIC Approach to High Performance Network Interface Design: Protected DMA and Other Techniques*; 1997 IEEE.
Erich Rutsche; *The Architecture of aGb/s Multimedia Protocol Adapter*, Computer ACM SIGCOMM Communication Review.
Kan Toyoshima, Kazuhiro Shirakawa, and Kazuhiro Hayashi; *Programmable ATM Adapter: Rapid Prototyping of Cell Processing Equipment fpr ATM Network*; 1997 IEEE.
Matthias A. Blumrich, Cezary Dubnicki, Edward W. Felten, and Kai Li; *Protected User–Level DMA for the SHRIMP Network Interface*; 1996 IEEE.
T. V. Lakshman, and U. Madhow; *Performance Analysis of Window–Based Flow Control Using TCP/IP: Effect of High Bandwidth–Delay Products and Random Loss*; High Performance Networking, 1994 IFIP.
K. K. Ramakrishnan; *Performance Considerations in Designing Network Interfaces*; IEEE Journal on Selected Areas in Communications, vol. 11, No. 2; Feb. 1993.
Jau–Hsiung Huang, and Chi–Wen Chen; *On Performance Measurements of TCP/IP and its Device Driver* 1992 IEEE.
Martin Siegel, Mark Williams, and George Robler; *Overcoming Bottlenecks in High–Speed Transport Systems*; 1991 IEEE.
Gerald w. Neufeld, Mabo Robert Ito, Murray Goldberg, Mark J. McCutcheon, and Stuart Ritchie; *Parallel Host Interface for an ATM Network; Host systems will not be able to take advantage of very–high–speed networks without parallel protocol systems*; IEEE Network; Jul. 1993.
K. Maly, S. Khanna, R. Mukkamala, C.M. Overstreet, R. Yerraballi, E.C. Foudriat, and B. Madan; *Parallel TCP/IP for Multiprocessor Workstations*; Oct. 29, 1992.
C. Brendan S. Traw, nd Jonathan M. Smith; *Hardware/Software Organization of a High–Performance ATM Host Interface*; 1993; IEEE.
David J. Preston; *Internet Protocols Migrate to Silicon for Networking Devices—Moving Internet standards tOnto ASOCs will bring the "Internet Toaster" to a Variety of Consumer Applications*; E;ectrical Design; Apr. 14, 1997.
V.S. Inanov–Loshkanov, S.F. Sevast'yanov, M.N. Semenov, I.M. Timofeev, V.A. Fogel, and A.M. Frenkel; *Network Microprocessor Adapter*; Avtomatika I Vychislitel'naya Tekhnika, vol. 17, No. 5; 1983.
William Frederick Jolitz; *High–Speed Nettworking; Header prediciton and forward–error correction for very high–speed data transfer*, Dr. Dobb's Journal; Aug. 1992.
Dave Chiswell; *Implementation Challenges for 155Mbit ATM Adapters*.
Takahiko Nagata, Yasuhiro Hosada and Hiroyuki Yamashita; *High–Performance TCP/IP/ATM Communications Board*; NTT Review; vol. 9, No. 6; Nov. 1997.
Jonathan M. Smith and C. Brendan S. Traw; *Giving Applicatiosn Access to Gb/s Networking; Design tradeoffs in an ATM to Gb/s host interface and its operating–system support have profound implications for applications performance*; IEEE Network; Jul. 1993.
Gr.A. Doumenis, D.I. Reisis, G.I. Stassinopoulos; *Efficient Implementation of the SAR Sublayer and the ATM Layer in High Speed Broadband ISDN Data Terminal Adapters*; 1993 IEEE.
Hanafy E. Meleis, and Dimitrios N. Serpanos; *Designing communication Subsystems for High–Speed Networks*; IEEE Network; Jul. 1992.
Peter Steenkiste; *Design, Implementation, and Evaluation of a Single–copoy Protocol Stack*; Spftware–Practice and Experience, vol. 28; Jun. 1998.
David D. Calrk, Van Jacobson, John Romkey, and Howard Salwen; *An Analysis of TCP Processing Overhead*; IEEE Communications magazine; Jun. 1989.
David D. Clark, John Romkey, and Howard Salwen;*An Analysis of TCP Processing Overhead*; 1988 IEEE.
Chris Dalton, Greg Watson, David Banks, Costas Calamvokis, Aled Edwards, and John Lumley; *Afterburner; A network–independent card provides architectural support for high–performance protocols*; IEEE Network; Jul. 1993.
Peter Steenkiste; *A High–Speed Network Interface for Distributed–Memory Systems: Architecture and Applications*; ACM Transactions on Computer Systems; vol. 15, No. 1; Feb. 1997.
David Banks, and Michael Prudence; *A High–Performance Network Architecture for a PA–RISC Workstation*; IEEE Journal on Selected Areas in Communications, vol. 11, No. 2; Feb. 1993.
Michael Yang and Ahmed Tantawy; *A Design Methodology for Protocol Processors*; 1995 IEEE.
Wright; *Intelligent Ethernet Boards*; EDN; Jun. 23, 1988.
Johnson et al, "Internet Tuner", New Media News, <http://www.newmedianews.com/020197/ts_Inettuner.html>, Jan. 1997.*
Kelly, T., "Cheap Internet Hardware that Fits in Everything", ZDNet, <http://www.zdnet.co.uk/news/1998/44/ns–5998.html>, Nov. 1998.*
Kittadeya et al., "Matsushita Launches WebTV Internet Connection Terminal", <http://www.mei.co.jp/corp/news/official.data/data.dir/en981112–1/en981112–1.html>, Nov. 1998.*
IReady Product Data Sheet, Internet Turner.*

* cited by examiner

MULTIPLE NETWORK PROTOCOL ENCODER/DECODER AND DATA PROCESSOR

Matter enclosed in heavy brackets [ ] appears in the original patent but forms no part of this reissue specification; matter printed in italics indicates the additions made by reissue.

BACKGROUND OF THE INVENTION

1. Technical Field

The invention relates to network protocols and data packets. More particularly, the invention relates to the decoding of network protocols and processing of packet data during packet reception without the time-consuming overhead of software or software/hardware implementations. In addition, the invention allows one pass parsing of the data, eliminating the buffering of data packets for different stacks, and thus minimizing the memory usage.

2. Description of the Prior Art

Computer networks necessitate the provision of various communication protocols to transmit and receive data. Typically, a computer network comprises a system of devices such as computers, printers and other computer peripherals, communicatively connected together. Data are transferred between each of these devices through data packets which are communicated through the network using a communication protocol standard. Many different protocol standards are in current use today. Examples of popular protocols are Internet Protocol (IP), Internetwork Packet Exchange (IPX), Sequenced Packet Exchange (SPX), Transmission Control Protocol (TCP), and Point to Point Protocol (PPP). Each network device contains a combination of hardware and software that translates protocols and process data.

An example is a computer attached to a Local Area Network (LAN) system, wherein a network device uses hardware to handle the Link Layer protocol, and software to handle the Network, Transport, and Communication Protocols and information data handling. The network device normally implements the one Link Layer protocol in hardware, limiting the attached computer to only that particular LAN protocol. The higher protocols, e.g. Network, Transport, and Communication protocols, along with the Data handlers, are implemented as software programs which process the data once they are passed through the network device hardware into system memory. The advantage to this implementation is that it allows a general purpose device such as the computer to be used in many different network setups and support any arbitrary network application that may be needed. The result of this implementation, however, is that the system requires a high processor overhead, a large amount of system memory, complicated configuration setup on the part of the computer user to coordinate the different software protocol and data handlers communicating to the computer's Operating System (O.S.) and computer and network hardware.

This high overhead required in processing time is demonstrated in U.S. Pat. No. 5,485,460 issued to Schrier et al on Jan. 16, 1996, which teaches a method of operating multiple software protocol stacks implementing the same protocol on a device. This type of implementation is used in Disk Operating System (DOS) based machines running Microsoft Windows. During normal operation, once the hardware verifies the transport or link layer protocol, the resulting data packet is sent to a software layer which determines the packets frame format and strips any specific frame headers. The packet is then sent to different protocol stacks where it is evaluated for the specific protocol. However, the packet may be sent to several protocols stacks before it is accepted or rejected. The time lag created by software protocol stacks prevent audio and video transmissions to be processed in real-time; the data must be buffered before playback. It is evident that the amount of processing overhead required to process a protocol is very high and extremely cumbersome and lends itself to applications with a powerful Central Processing Unit (CPU) and a large amount of memory.

Consumer products that do not fit in the traditional models of a network device are entering the market. A few examples of these products are pagers, cellular phones, game machines, smart telephones, and televisions. Most of these products have small footprints, 8-bit controllers, limited memory or require a very limited form factor. Consumer products such as these are simplistic and require low cost and low power consumption. The previously mentioned protocol implementations require too much hardware and processor power to meet these requirements. The complexity of such implementations are difficult to incorporate into consumer products in a cost effective way. If network access can be simplified such that it may be easily manufactured on a low-cost, low-power, and small form-factor device, these products can access network services, such as the Internet.

SUMMARY OF THE INVENTION

The invention provides a low-cost, low-power, easily manufacturable, small form-factor network access module which has a low memory demand and provides a highly efficient protocol decode. The invention comprises a hardware-integrated system that both decodes multiple network protocols in a byte-streaming manner concurrently and processes packet data in one pass, thereby reducing system memory and form factor requirements, while also eliminating software CPU overhead.

The preferred embodiment of the invention comprises a network protocol layer, data handler, O.S. State Machine, and memory manager state machines implemented at a hardware gate level. Network packets are received from a physical transport level mechanism by the network protocol layer state machine. The protocol state machine decodes network protocols such as TCP, IP, User Datagram Protocol (UDP), PPP, and Raw Socket concurrently as each byte is received. Each protocol handler parses, interprets, and strips header information immediately from the packet, requiring no intermediate memory. The resulting data are passed to the next protocol layer or data handler for which the latter case consists of data state machines that decode data formats such as email, graphics, Hypertext Transfer Protocol (HTTP), Java, and Hypertext Markup Language (HTML). Each data state machine reacts accordingly to the pertinent data, and any data that are required by more than one data state machine are provided to each state machine concurrently. Any data that are required more than once by a specific data state machine, are placed in a specific memory location with a pointer designating such data (thereby ensuring minimal memory usage). Resulting display data are immediately passed preformatted to a display controller. Any outgoing network packets are created by the data state machines and passed through the network protocol state machine which adds formats to the packet, and checksums the information header information, and forwards the resulting network packet via a physical transport level mechanism.

The preferred embodiment does not necessarily require a CPU and software to process the network packets, thereby greatly reducing system cost. The hardware gate level implementation provides a modular, embeddable design whereupon the designer may pick and choose the functionality that the particular application requires and still retain a low cost, low power, small form factor.

DETAILED DESCRIPTION OF THE INVENTION

Figure 1:
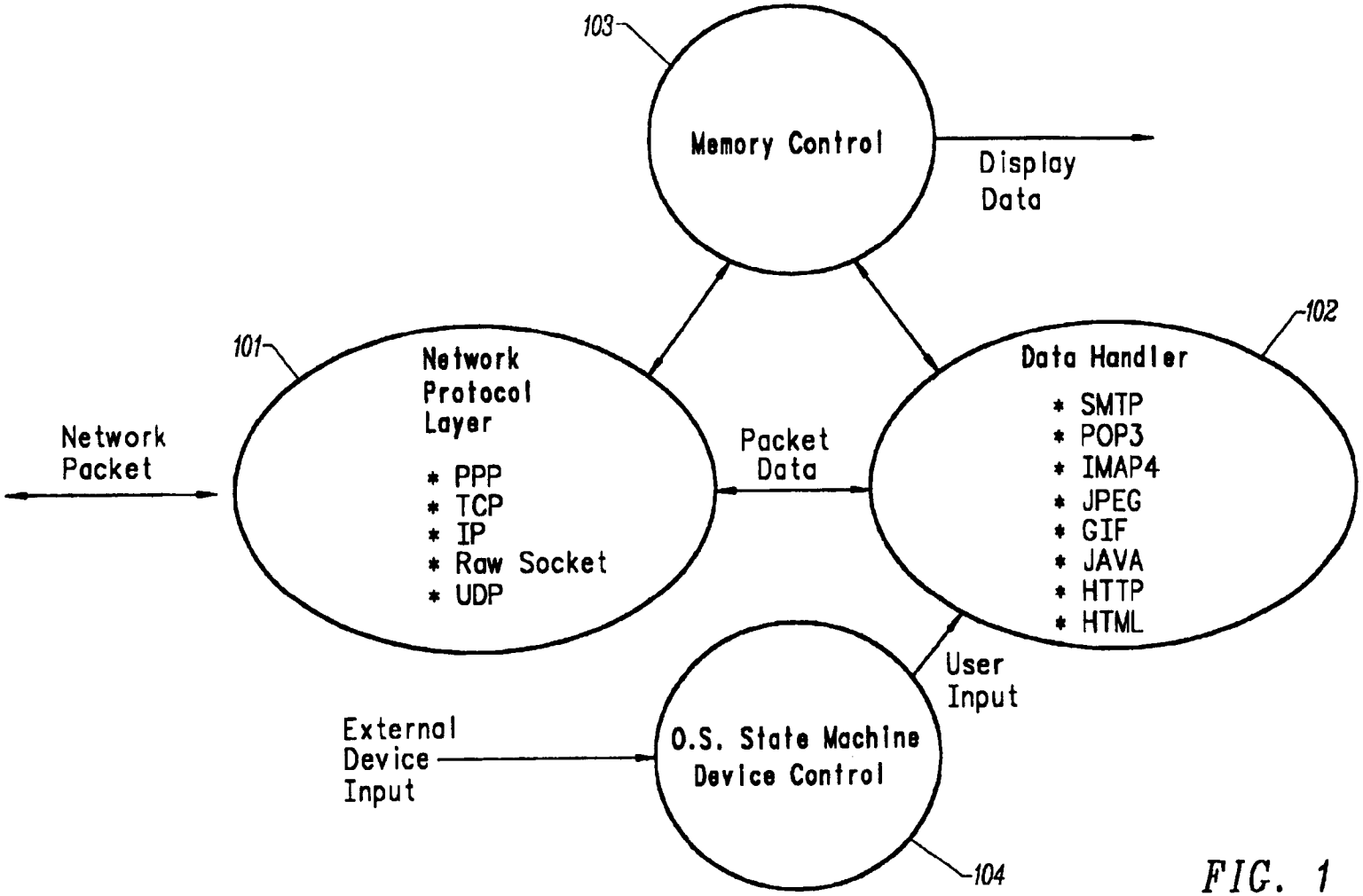
FIG. 1 is a high-level data flow diagram of the core system according to the invention.

Referring to FIG. 1, the invention comprises a Network Protocol Layer 101, a Data Handler 102, a Memory Control module 103, and an Operating System (O.S.) State Machine module 104, each implemented at the hardware gate level. The Network Protocol Layer 101 decodes incoming and encodes outgoing network packets. The Network Protocol Layer 101 comprises a plurality of state machines representing different network protocol stacks (i.e. PPP, TCP, IP, UDP, and Raw Socket) which simultaneously decode incoming network packets. The implementation of the protocol stacks in gate level logic allows the real time decoding of the network packet as the packet is received, thereby requiring no temporary memory storage. After all of the packet header information is stripped out and verified by the state machines, the resulting data is passed to the Data Handler 102. The Data Handler 102 comprises a plurality of state machines, each of which process a specific data type (i.e. HTTP, email formats (Post Office Protocol (POP3), Internet Message Access Protocol (IMAP4), Simple Mail Transfer Protocol (SMTP)), graphics standards (Joint Photographic Experts Group (JPEG), Graphics Interchange Format (GIF)), Java, and HTML). The gate level implementation of the data handlers enable the invention to concurrently process received data in real time and is especially suitable for applications which handle streams of data as they are received, i.e. Java, HTML, POP3 email, and audio and video applications. Any data that are required by more than one data state machine are provided in a concurrent manner. Any data required more than once by a specific data state machine are placed in a specific memory location with a pointer designating them. All memory accesses are arbitrated through the Memory Control module 103. Any resulting display data are also routed through the Memory Control module 103. The O.S. State Machine 104, acts as an arbitrator between all of the state machines for resource control, system, and user interface. Any user input is interpreted by the O.S. State Machine and routed to the Data Handler 102.

As an example, a data handler that interprets HTML format could decode the HTML tags using a Cyclic Redundancy Check (CRC) calculation. HTML format contains character strings known as tags, which control the formatting of a subsequent block of text when displayed on a video output device. These tags may be efficiently decoded by generating a CRC number for a given tag and using said number to enable a formatting instruction. Such a decoding algorithm is suited for gate level implementation and provides for an HTML encoded document to be displayed on a video output device much more quickly than is currently possible.

Although the invention is described as being at the hardware gate level, one skilled in the art can readily appreciate that these functions may be implemented in many other ways such as Programmable Array Logic (PALs), General Array Logic (GALs), Read Only Memory (ROMs), and software. Additionally, specific protocols and data types have been indicated and one skilled in the art can readily appreciate that the modularity of the invention does not limit it to those specific protocols or data types.

Figure 2:
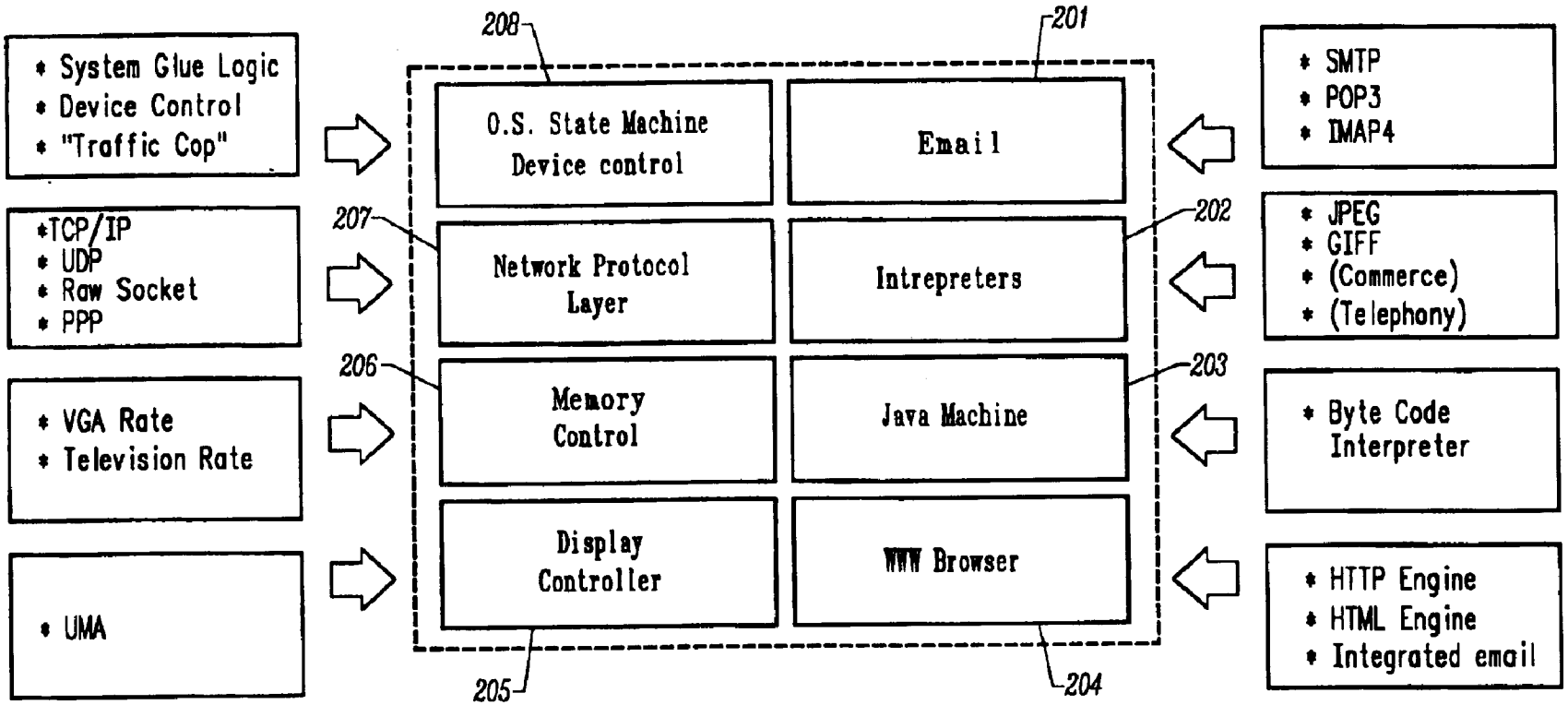
FIG. 2 is a high-level block diagram of a system according to the invention.

Turning to FIG. 2, the invention is represented in a high-level block diagram. This diagram describes the operational task of each module in a full implementation of the invention. The O.S. State Machine 208, contains the system "glue" logic, and the device control interface, and acts as a "traffic cop" between the state machines of the other modules. The Network Protocol Layer 207, contains state machines for TCP/IP, UDP, Raw Socket, and PPP protocols. The Memory Control module 206 contains the logic for the Unified Memory Architecture (UMA) which allows the system and video display memory to reside in the same memory area. A Display Controller 205 provides control of a VGA, television standard, or other type of display. Four data handlers are used in this implementation. An Email data handler 201 interprets both POP3 and IMAP4 formats. Interpreters 202 are implemented which decode JPEG and GIF formats (commerce and telephony standards may also be decoded). A Java Machine 203 is also included which interprets the Java language byte codes. The World-Wide Web (WWW) Browser 204, contains an HTML decoder/accelerator, HTTP Data handler and an integrated email state machine.

As an example, an incoming JPEG image packet is traced through the system, assuming a MODEM physical transport. The request starts with the user indicating a desire to download a given JPEG image by typing on keyboard 321. This input is interpreted by the keyboard interface 316 and passed to the O.S. State machine 315. O.S. State machine 315 processes the input and passes it as a command to the HTTP client 311. The HTTP client creates a request packet and passes it via the Port Decoder 309 to the TCP Layer 308.

The TCP Layer prepends the appropriate TCP header and passes it to the IP Layer 307. The IP layer then prepends the appropriate IP header and passes the packet to the PPP layer 306. The PPP Layer prepends the appropriate header, appends an FCS, and passes the data to the Physical Transport Interface 305. The Physical Transport Interface serializes the data into a bit stream and sends the packet to the MODEM unit 304. When the request is accepted by the host server, it sends the requested JPEG image back to the client system. The data are first received by the MODEM 304 which indicates to the Physical Transport Interface 305 that data are present. The Physical Transport interface then reads the bit serial data from the MODEM, converts it to a parallel byte data, and indicates to the PPP Layer 306 that data are present. The PPP Layer reads in the received bytes. When it detects a valid start byte, it begins to parse the incoming bytes. When the byte stream reaches the PPP protocol field, the PPP Layer decodes it, and in this example decodes the embedded packet as being of type IP. In response to this protocol byte, the PPP Layer enables the IP Layer 307 and indicates to it that IP data are being received. All further data bytes received are now passed directly to the IP Layer. The IP Layer then begins to parse the incoming data bytes. When it comes to the IP header protocol field, it determines which higher protocol to enable. In this example, the IP Layer decodes the protocol field as being of type TCP. At this point, the IP Layer enables the TCP Layer 308 and indicates to it when TCP data are being received. When this indicator goes active, all further data bytes in the received packets are sent to both the IP and TCP Layers (IP Layer needs the data bytes to complete checksum calculations). The TCP Layer then begins to parse the incoming data bytes. When it comes to the TCP header destination port field, it determines which data handler to enable. In this example, the PORT field decodes to the HTTP client 311. At this point, the PORT decoder enables the HTTP client and indicate to it that HTTP requested data are being received. The HTTP client then begins to parse received data bytes. When the HTTP client determines that the packet is of type JPEG image, the HTTP client enables the JPEG decoder 313. At this point, all data bytes are now routed to the JPEG decoder. The JPEG decoder then receives all further incoming data bytes and processes them accordingly. The resulting decoded image is sent to the display memory via the Memory Controller 312 to be processed by the Display Controller 324 for output to display device 326.

Figure 3:
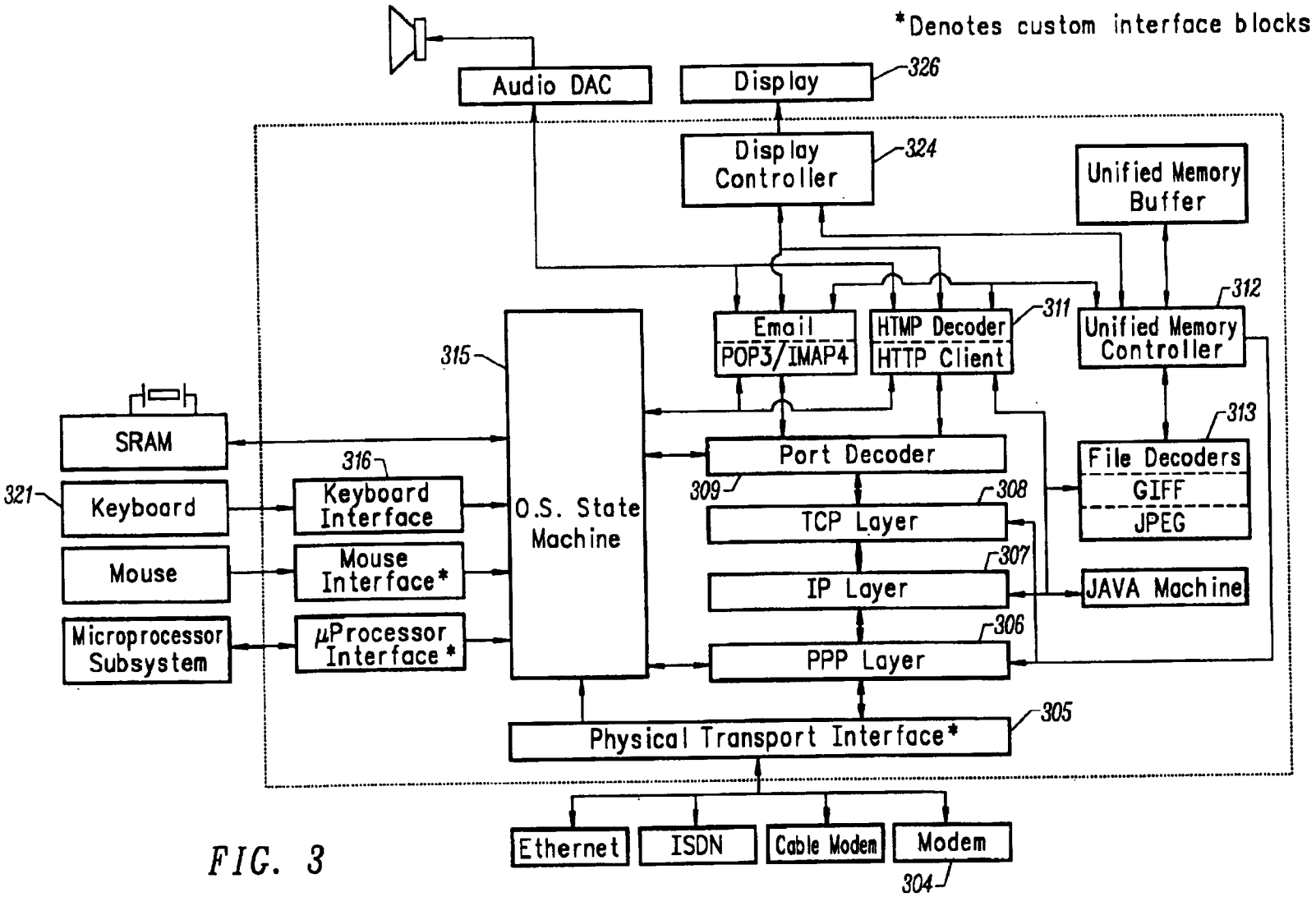
FIG. 3 is a functional block diagram of a complete system implementation according to the invention.
Figure 3A:
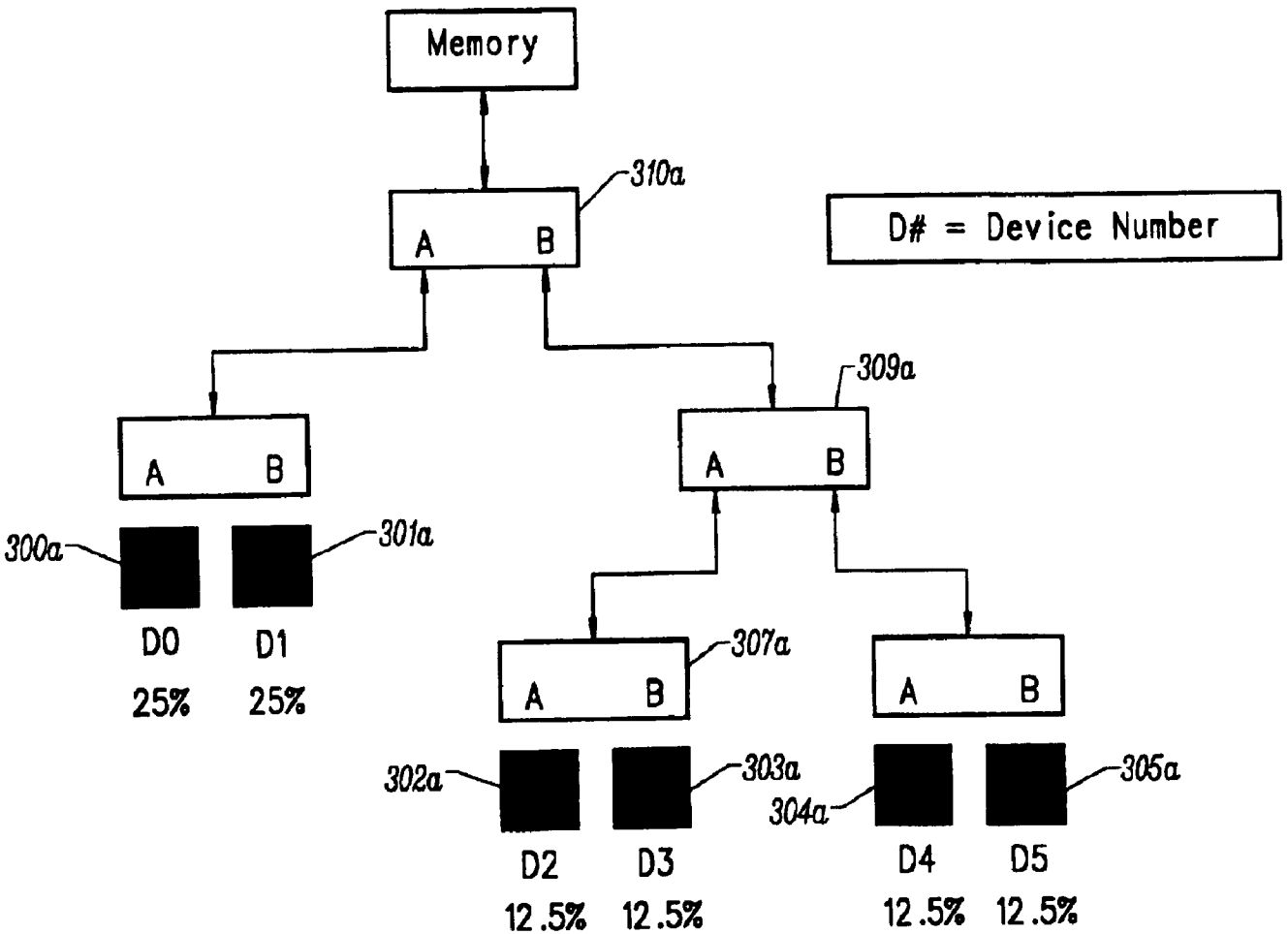
FIG. 3A is a functional block diagram of the UMA memory controller according to the invention.

As also noted in FIG. 3, various layers need access to a shared memory resource. All memory accesses are arbitrated by a single memory controller. This memory controller determines which layer or handler has access at any given cycle to the unified memory buffer. This memory controller is needed due to the fact that all system and display memory buffers are shared within a single memory buffer unit. The unified memory controller 312 takes read and write requests from the various layers, arbitrates the requests based on a dynamic rotating arbitration scheme with fixed priority weighting. This algorithm is depicted in FIG. 3A. If, in the pictured configuration, device D2 302A and device D3 303A both request memory access at the same time, then the arbitor 307A awards the cycle to the device that has not had the most recent memory access. The arbitor 307A then passes its memory request to the A input arbitor 309A. If the B input on arbitor 309A is idle, then the request is passed up to the B input of arbitor 310A. If the A input to the arbitor 310A is idle, then the request is made to the memory unit. All arbitration determinations are performed using combinatorial logic, thereby eliminating any wait states to any device if no other memory requests are being made. Priority weighting is assigned by configuring the arbitration tree structure. In FIG. 3A, Device DO 300A and Device D1 301A each have 25% priority weighting meaning that if all devices requested constant memory usage, they would each win the arbitration 25% of the time. Devices D2 302A, D3 303A, D4 304A, and D5 305A each have 12.5% priority weighting. The memory controller design is simplified by having each of the individual arbitration units having the same logic structure. In this scheme, the number of requesting devices, and their priority weighting can easily be configured by adding and arranging arbitor units.

Figure 4:
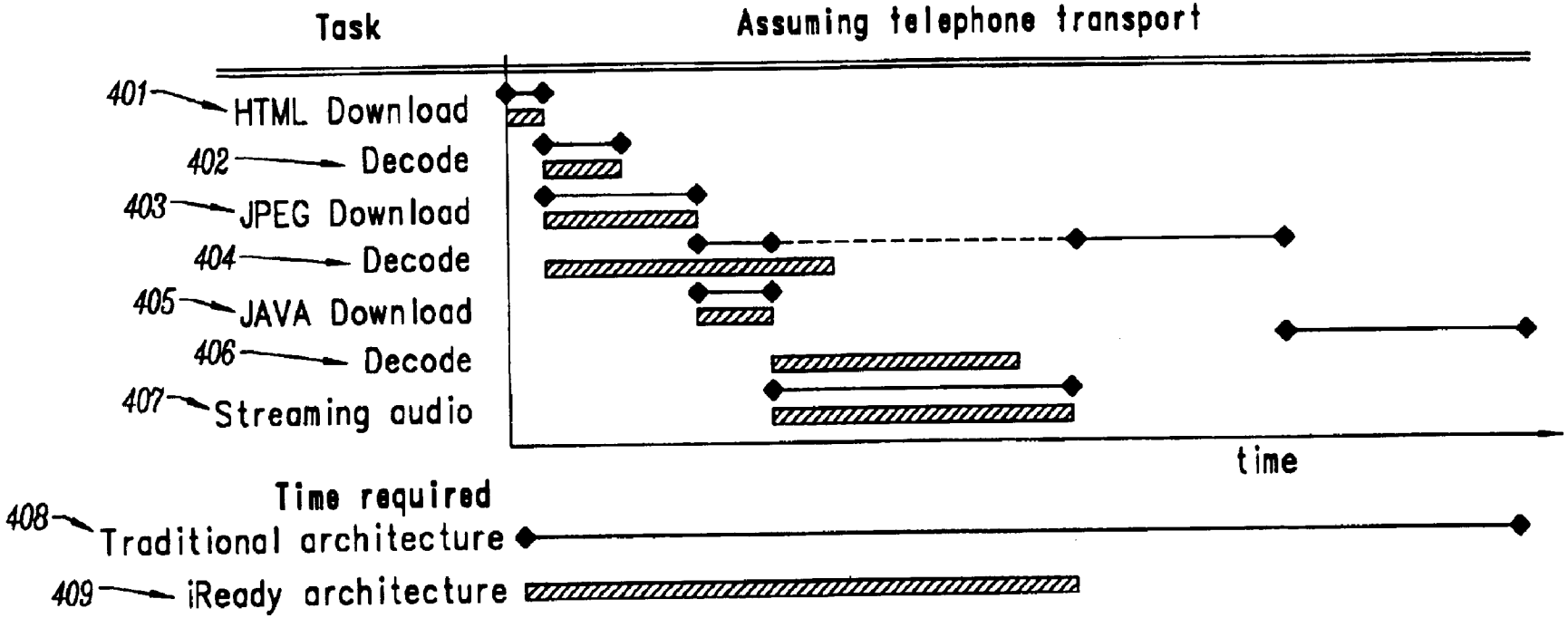
FIG. 4 is a time comparison chart illustrating data task time requirements for a traditional architecture and the invention.

Turning to FIG. 4, the speed advantages that the invention offers are much higher than the traditional architecture currently in use. The figure represents the time needed to complete each task. For a series of packets that require an HTML download 401, decode of the HTML 402, JPEG download 403, decode of the JPEG 404, JAVA download 405, decode of the JAVA bytes 406, and streaming audio 407, the total time required for these tasks is shown for the traditional architecture 408 and the invention (iReady architecture) 409. The invention 409 is significantly faster for these tasks than the traditional architecture 408.

Figure 5:
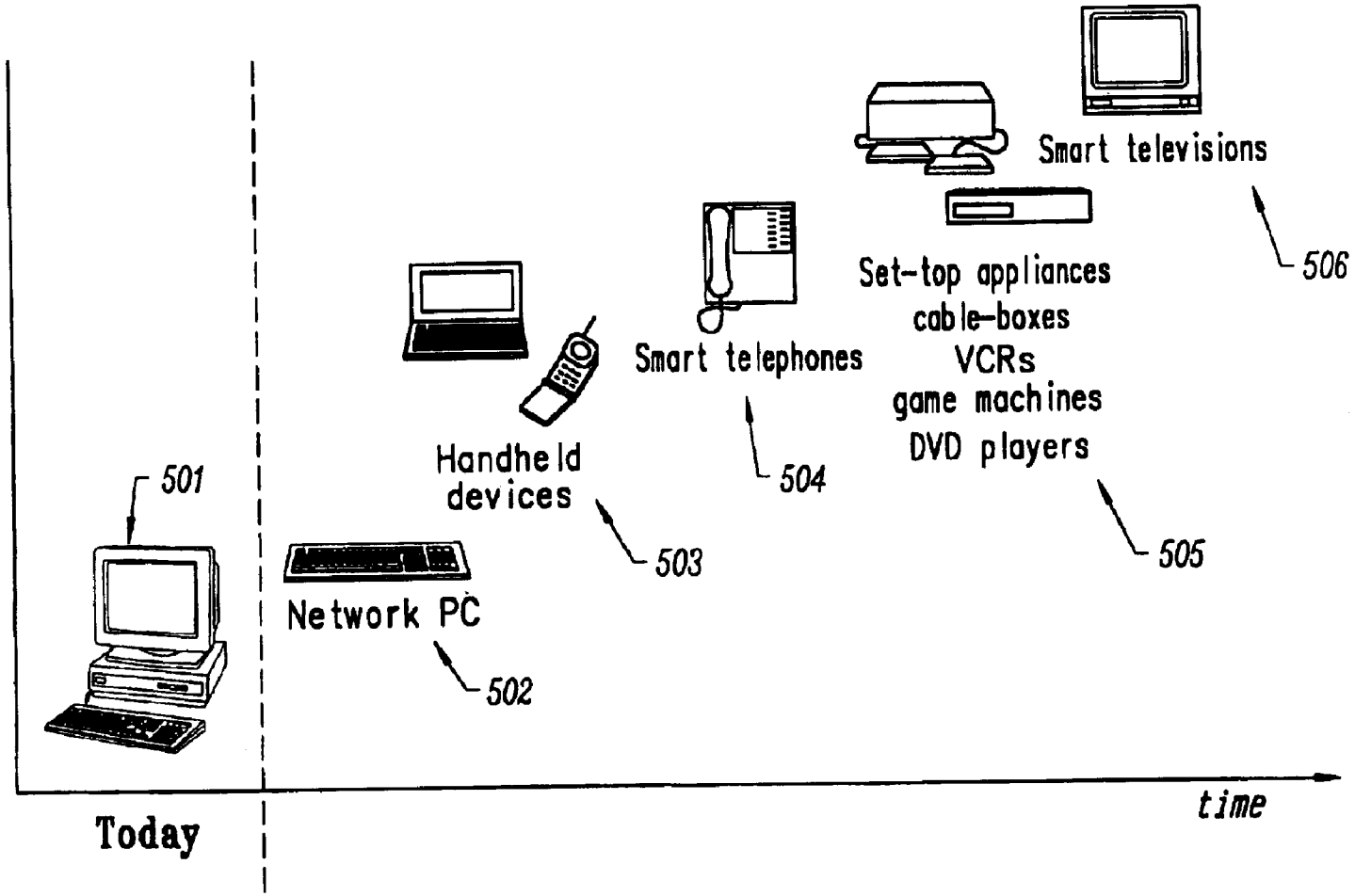
FIG. 5 illustrates the possible progression of applications according to the invention.

Turning to FIG. 5, the progression of applications for this type of network access is shown. Presently, the traditional model of the network client is being used, namely the computer 501. The consumer appliance concepts of the Network PC 502, handheld devices 503, smart telephones 504, set-top appliances 505, and smart televisions 506 are now becoming a reality. The invention provides these products with a cost-effective, space, speed, and power conscious network access.

Figure 6:
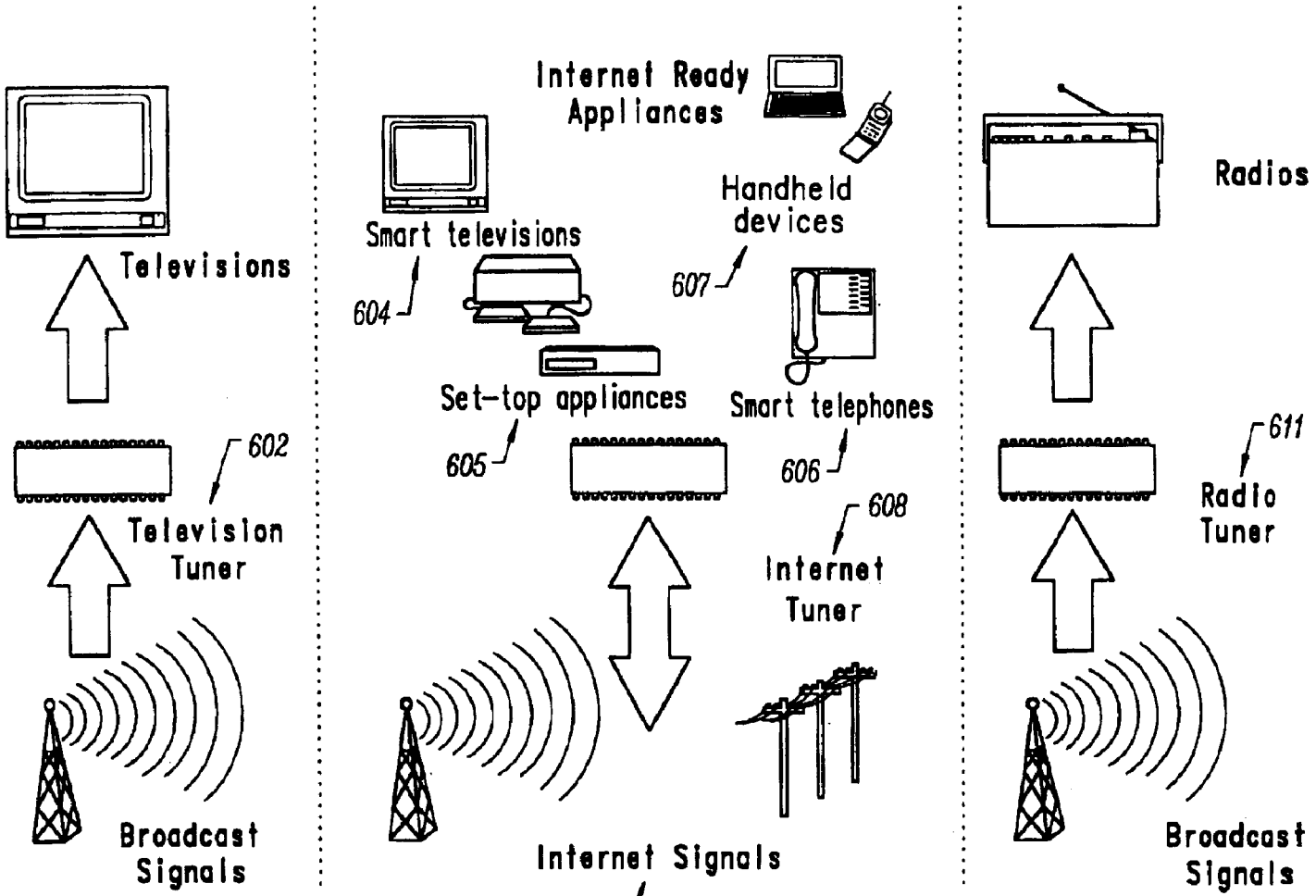
FIG. 6 illustrates the concept of an Internet Tuner according to the invention.

Referring to FIG. 6, the invention operates much like a television 602 or radio tuner 611—the signals (packets) are processed immediately without delay and sent to a display or audio output. The term Internet Tuner 608 is used to describe the invention as an analogy to such signal processing devices. The Internet Tuner 608 acts as the interface between the Internet signals 609 and application products such as smart televisions 604, set-top appliances 605, smart telephones 606, and handheld devices 607. It processes Internet signals 609 in real-time as do television 602 and radio tuners 611.

Figure 7:
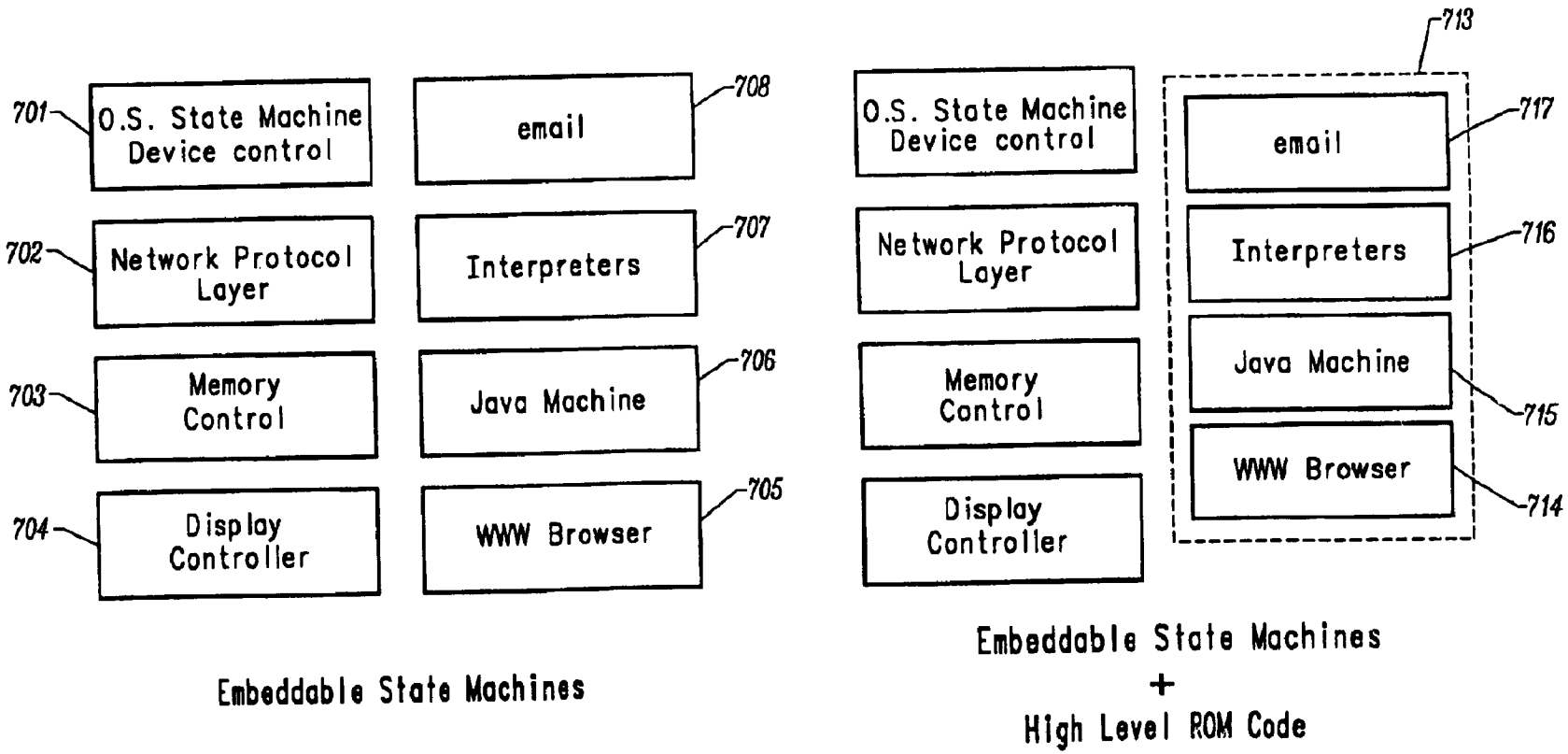
FIG. 7 illustrates two implementations according to the invention.

FIG. 7 illustrates that a full implementation of the invention using the O.S. State Machine 701, Network Protocol Layer 702, Memory Control 703, Display Controller 704, email data handler 708, Interpreters 707, Java Machine 706, and WWW Browser 705 may be separated into two separate modules. The modularity of the invention allows functions such as the data handlers 713 (email data handler 717, Interpreters 716, Java Machine 715, and WWW Browser 714) to be separated and placed into a high-level ROM code for certain applications.

The following application examples further illustrate the versatility of the modular design of the invention.

Figure 8:
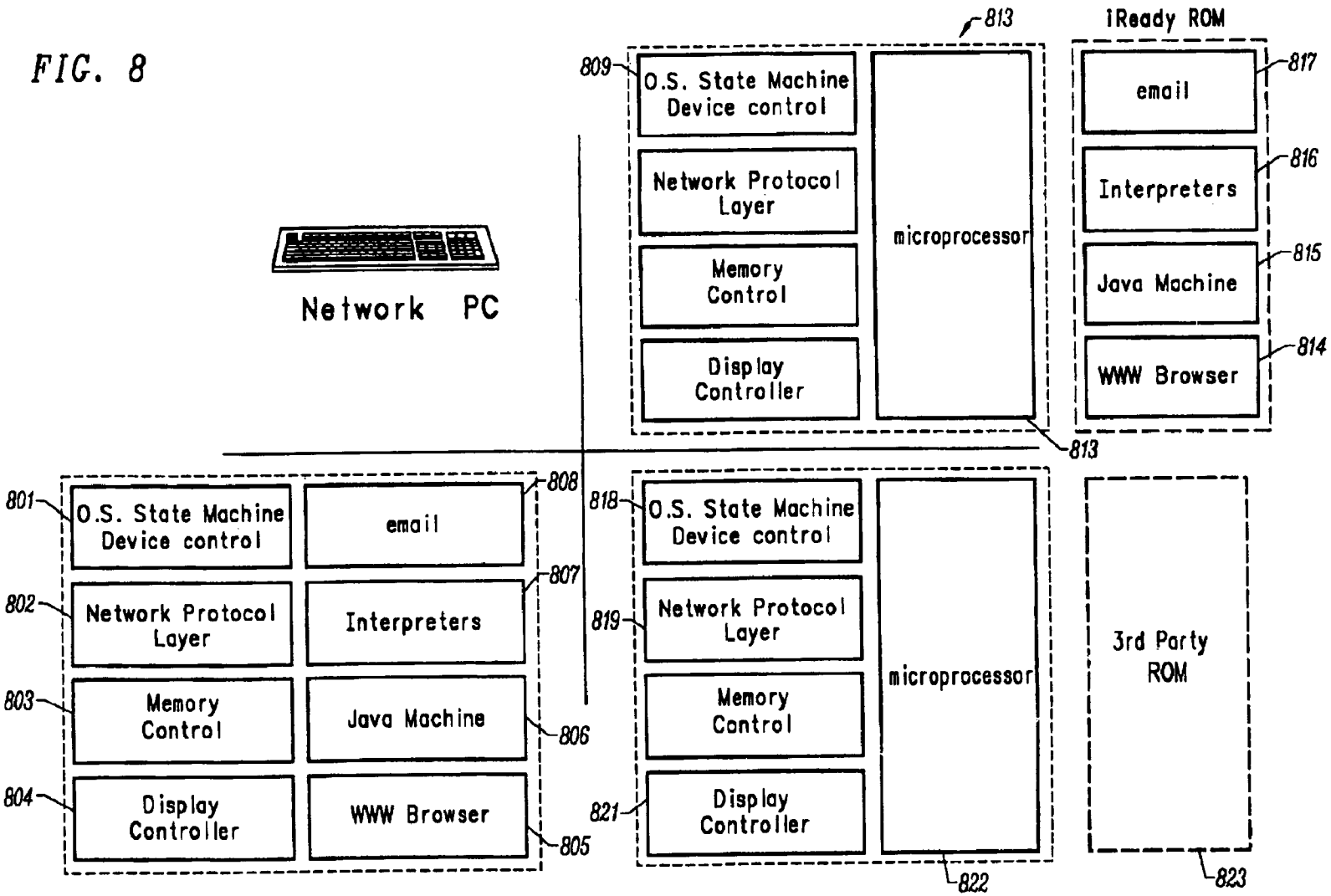
FIG. 8 illustrates Network PC implementations according to the invention.

FIG. 8 demonstrates the possible configurations of the invention for a Network PC. One variation includes the O.S. State Machine 801, Network Protocol Layer 802, Memory Control 803, Display Controller 804, email data handler 808, Interpreters 807, Java Machine 806, and the WWW Browser 805. This can be varied by placing the data handlers for email 817. Interpreters 816, Java Machine 815, and WWW Browser 814 code into high-level ROM running on a microprocessor 813. The microprocessor 813 communicates through the O.S. State Machine 809 for network and display functions. A third variation allows a microprocessor 822 running off of a 3rd Party ROM 823 to interpret the data coming from the Network Protocol Layer 819 and O.S. State Machine 818. The microprocessor 822 displays data through the Display Controller 821.

Figure 9:
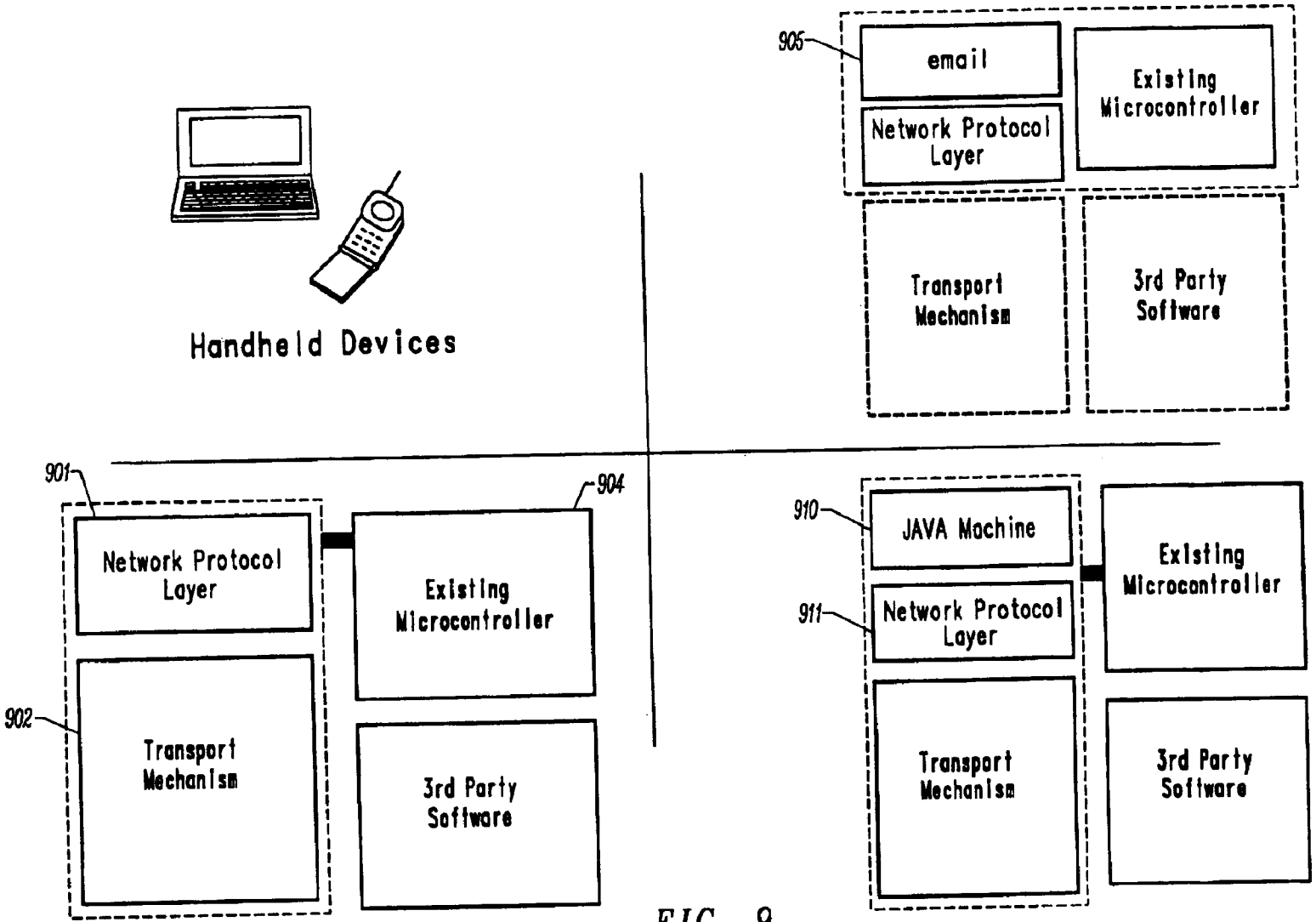
FIG. 9 illustrates Handheld Devices implementations according to the invention.

Turning to FIG. 9, a handheld device may use only the Network Protocol Layer 901 and interface it to a custom Transport Mechanism 902 and Existing Microcontroller 904. Email functions may be added by including the email data handler 905 in the configuration. Further demonstrating the modularity of the invention, the Network Protocol Layer 911 and Java Machine 910 may be added to a handheld device, thereby allowing it to process Java applets.

Figure 10:
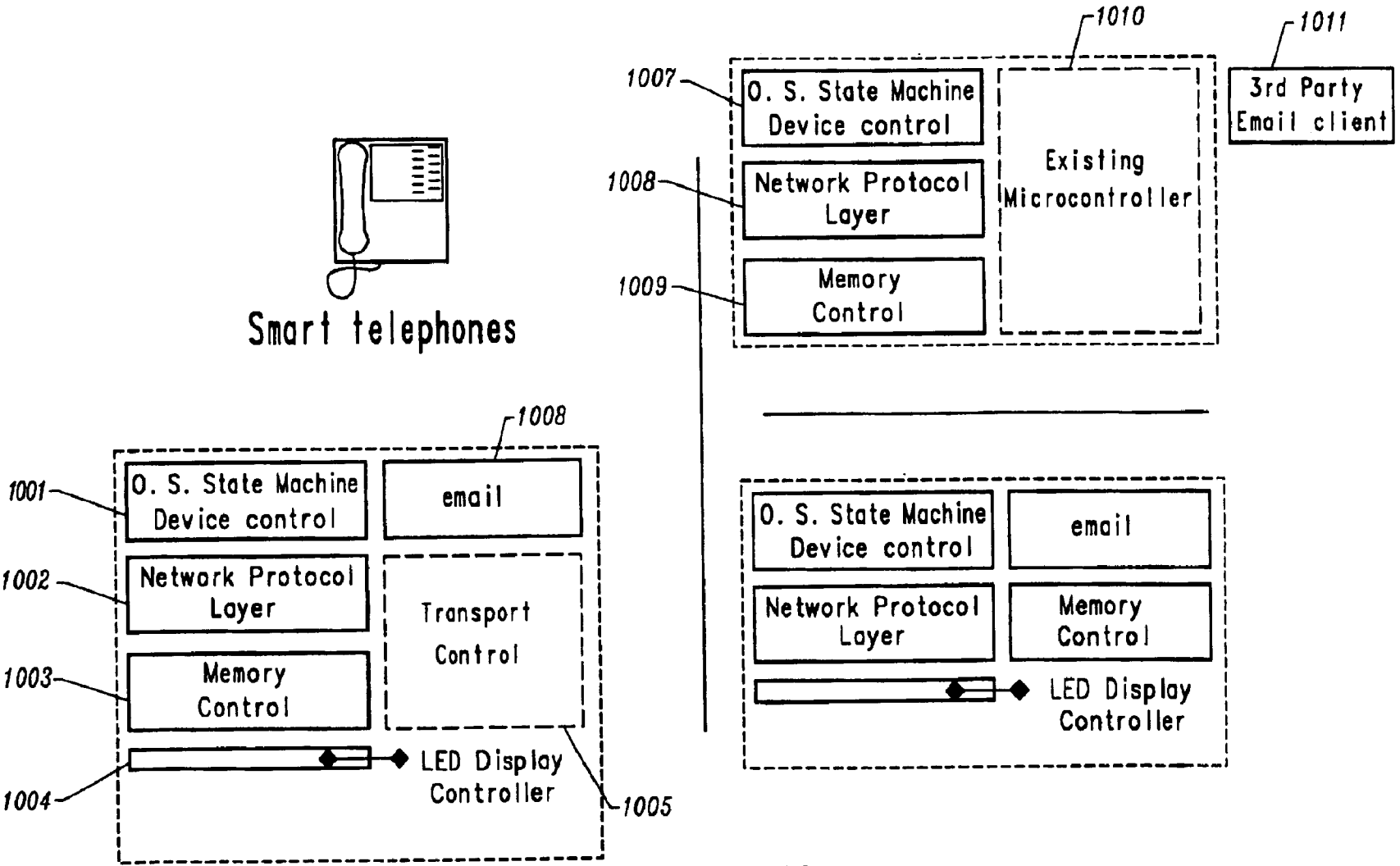
FIG. 10 illustrates Smart Telephone implementations according to the invention.

Referring to FIG. 10, smart telephones may add email capabilities by implementing the O.S. State Machine 1001, Network Protocol Layer 1002, Memory Control 1003, email data handler 1006, and Display Controller 1004. The Display Controller 1004 is capable of controlling Light Emitting Diode (LED), Liquid Crystal Display (LCD) displays, or big-mapped displays. A Physical Transport Control 1005 may optionally be added, depending on the connectivity requirements of the smart telephone. The O.S. State Machine 1007, Network Protocol Layer 1008, and Memory Controller 1009 may be added to smart telephones with an existing microcontroller 1010. The microcontroller 1010 performs email functions using a 3rd Party email client code 1011.

Figure 11:
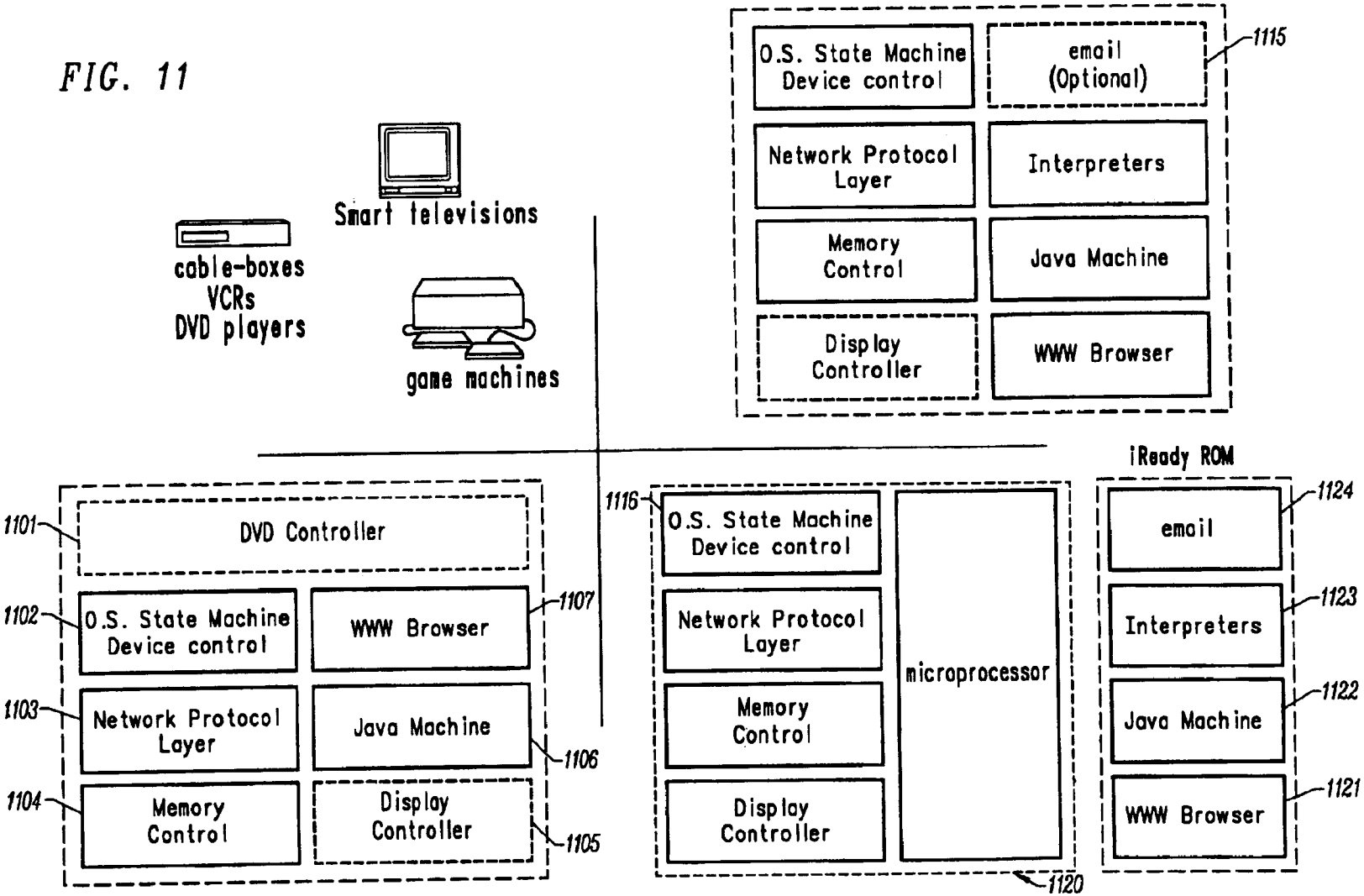
FIG. 11 illustrates Smart Television, cable-box, Video Cassette Recorder (VCR), Digital Video Disc (DVD) and game machine implementations according to the invention.

Turning finally to FIG. 11, smart televisions, cable-boxes, Video Cassette Recorders (VCRs), Digital Video Disc (DVD) players, and game machines can take advantage of the network accessibility offereNety the invention. The O.S. State Machine 1102, Network Protocol Layer 1103, Memory Controller 1104, WWW Browser 1107, Java Machine 1106, and (optionally) the Display Controller 1105 are interfaced to an existing controller 1101. If a controller 1101 is not present, the Display Controller 1105 is used. Email 1115 functions are easily added due to the modularity of the invention. As noted previously, the data handlers for email 1124, Interpreters 1123, Java Machine 1122, and WWW Browser 1121 code are optionally placed into high level ROM running on a microprocessor 1120. The microprocessor 1120 communicates through the O.S. State Machine 1116 for network and display functions.

Example of Packet Reception

Figure 12:
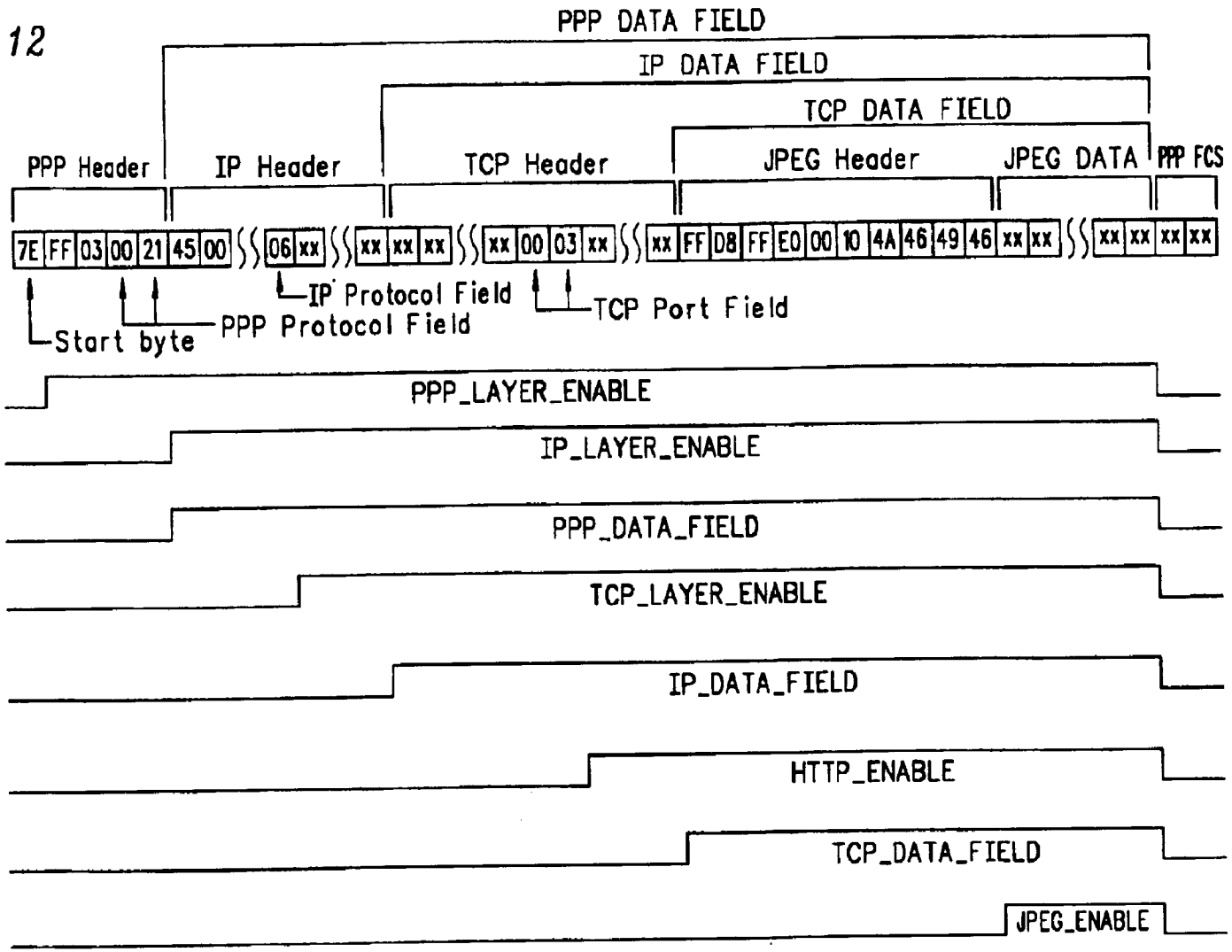
FIG. 12 is a timing diagram sharing a received packet according to the invention.

FIG. 12 depicts a received network packet. The packet contains the following items as shown from left to right:

PPP header
IP header
TCP header
JPEG Data
PPP FCS (Field Checksum)

Figure 13:
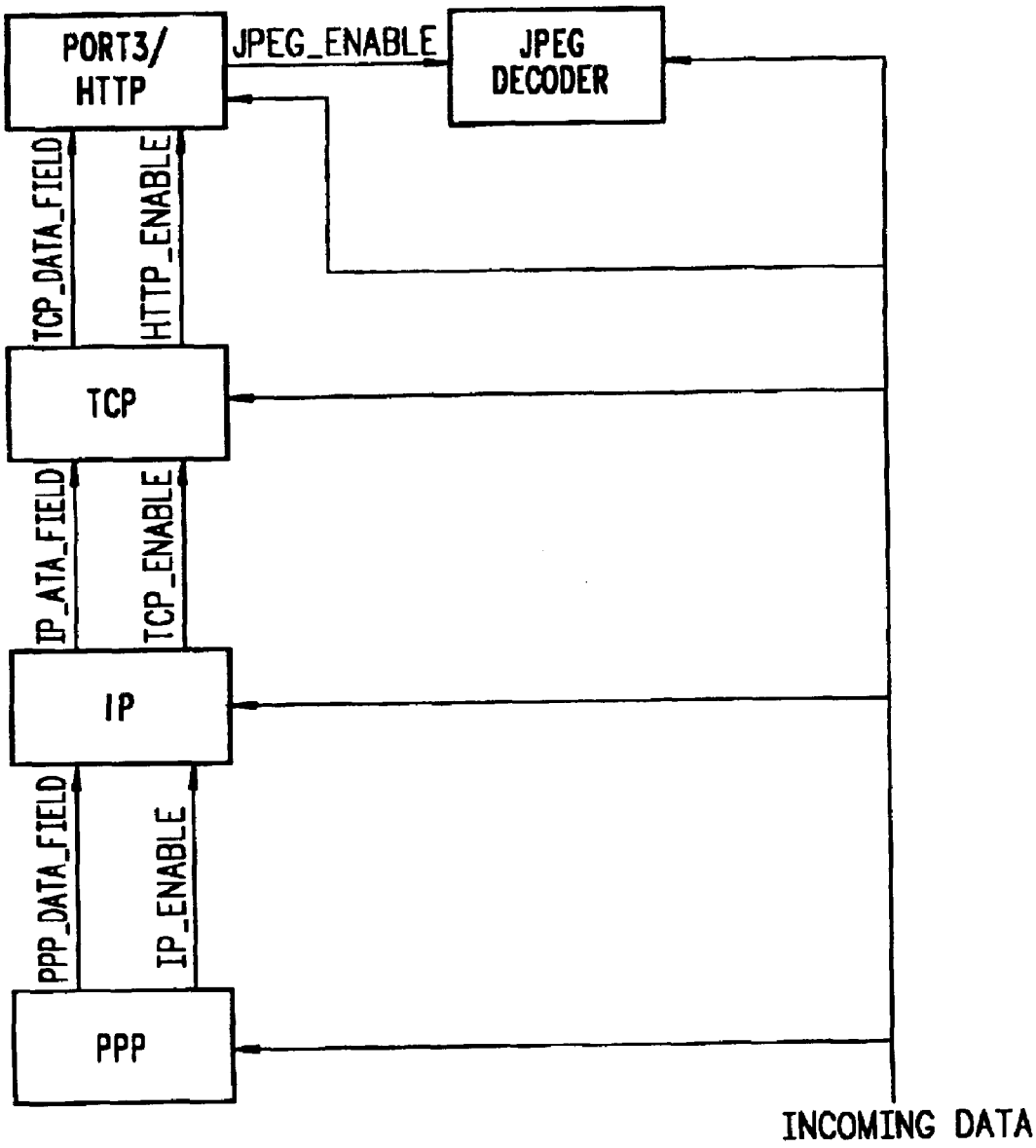
FIG. 13 is a block schematic diagram showing signal flow for the packet of claim 12 according to the invention.

The line labeled PPP LAYER ENABLE is activated when a valid start byte is detected, and is generated within the PPP block in FIG. 13. Once this line goes high, the rest of the PPP block is activated. Within the PPP header is a field indicating the type of protocol that the PPP packet is encapsulating. In an uncompressed PPP header, these are bytes 4 and 5 (counting the start byte 0×7e). In FIG. 12, these bytes are 0×00 and 0×21 indicating that the encapsulated data is an IP packet. After decoding this field, the PPP block activates the IP LAYER ENABLE and PPP DATA FIELD signals, which together enable the IP block in FIG. 13. The IP LAYER ENABLE line is decoded from the PPP protocol field, and the PPP DATA FIELD line indicates that the incoming data byte stream is in the data field portion of the network packet. These two lines must be active for the IP block to be enabled. Once the IP block is enabled, it starts to parse the incoming data bytes. Referring back to FIG. 12, the data immediately following the PPP header is the IP header. Within the IP header is a field indicating the type of data that is encapsulated within the IP packet. In FIG. 12, this field is shown to be 0×06 indicating that the encapsulated data is a TCP packet. The TCP LAYER ENABLE line is activated in response to the IP block decoding this field. The IP DATA FIELD line goes active a couple of bytes later, because there are some bytes that come between the IP header protocol field and the start of the IP data field. The IP DATA FIELD signal indicates that the incoming data byte streams is in the data field portion of the network packet. Both the TCP LAYER ENABLE and IP DATA FIELD lines must be active in order for the TCP block in FIG. 13 to be enabled. Once the TCP block is enabled, it starts to parse incoming data bytes. Referring back to FIG. 12, the data immediately following the IP header is the TCP header. Within the TCP header is a 2 byte field for the destination port. This field indicates which application or data handler the encapsulated data is meant for. In FIG. 12, this field decodes to port 0×0003. In FIG. 13, port 3 is designated as the HTTP port. After decoding the destination port field within the TCP header, the HTTP ENABLE line is activated. The TCP DATA FIELD line is activated a couple of bytes later because there are some intermediate bytes between the destination port field and the start of the TCP data field. Both the HTTP ENABLE and TCP DATA FIELD lines must be active for the HTTP/PORT3 block in FIG. 13 to be enabled. Once the HTTP block is enabled, it starts to parse incoming data bytes. When it decodes the JPEG header, it enables the JPEG decoder block in FIG. 13. Once the JPEG decoder is enabled, it starts to process incoming bytes. The JPEG enable line is the only line needed to enable the JPEG block.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. An apparatus for decoding and encoding network protocols and data, comprising:

a network protocol layer module for receiving and transmitting network packets and for encoding and decoding network packet*s* [bytes] which comprise packet data;

a data handler module for exchanging said packet data with said network protocol layer module and for processing [a] *at least one* specific data type *or protocol*;

a memory control module in communication with said data handler module for arbitrating memory accesses [and for providing display data]; and

[an operating system (o.s.)] *at least one* state machine module that is optimized for a single selected network protocol, said [o.s.] *at least one state machine* module in communication with said data handler module [and providing resource control and system and user interfaces];

wherein said network protocol layer module, said data handler module, said memory control module, and said [operating system (o.s.)] *at least one* state machine module *comprise corresponding dedicated hardware structures that* are implemented in [hardware] gate level circuitry.

2. The apparatus of claim 1, wherein said network protocol layer module comprises a plurality of state machines representing different network protocol[s] *stacks*.

3. The apparatus of claim [2] *1*, wherein said network protocol layer module implements one or more of the following network protocols: Point to Point Protocol (PPP), Internetwork Packet (IP), Transmission Control Protocol (TCP), Raw Socket, and/or User Datagram Protocol (UDP).

4. The apparatus of claim [2] *1*, wherein said network packet*s* [bytes] are processed in real time.

5. The apparatus of claim [2] *1*, wherein said network packet*s* [bytes] are processed concurrently.

6. The apparatus of claim [2] *1*, wherein said network packet*s* [bytes] are processed [byte-]serially.

7. The apparatus of claim 1, wherein any data required more than once by a specific said state machine is placed in a specific memory location with a pointer designating said memory location.

8. The apparatus of claim 1, wherein said data handler module comprises at least one state machine which process*es* a specific data type.

9. The apparatus of claim 8, wherein said data handler module processes one or more of the following protocols: Hypertext Transfer Protocol (HTTP), Hypertext Markup Language (HTML), Post Office Protocol (POP3), Internet Message Access Protocol (IMAP4), Simple Mail Transfer Protocol (SMTP), Joint Photographic Experts Group (JPEG), Graphics Interchange Format (GIF), and/or Java language.

10. The apparatus of claim 8, wherein said data type is processed in real time.

11. The apparatus of claim 8, wherein said data type is processed concurrently.

12. The apparatus of claim 8, wherein said data type is processed [byte] serially.

13. The apparatus of claim 8, wherein any data shared by said at least one state machine or required more than once by a specific said state machine is placed in a specific memory location with a pointer designating said memory location.

14. The apparatus of claim 8, wherein any data shared by said at least one state machine is provided to said state machine(s) concurrently.

15. The apparatus of claim 1, wherein said memory control module arbitrates all memory accesses.

16. The apparatus of claim 1, wherein said memory control module contains a Unified Memory Architecture (UMA) which allows a system memory and a video memory to reside in a same memory area.

17. The apparatus of claim 1, wherein said memory control module is comprised of one or more arbiter logic blocks where an arbiter block arbitrates according to a dynamic rotating algorithm between two devices.

18. The apparatus of claim 1, wherein said memory control module is comprised of one or more arbiter logic blocks arranged in such a manner as to give a fixed weighted priority to each of a plurality of devices for memory access based on a given arbiter tree structure.

19. The apparatus of claim 1, [wherein said o.s.] *further comprising an arbitrator* state machine *that* acts as an arbitrator between said network protocol layer module, said data handler module, and said memory control module for resource control, system and user interface.

20. The apparatus of claim 1, further comprising:

a display controller.

21. The apparatus of claim 20, wherein said display controller controls one of the following types of displays: VGA, television, Liquid Crystal Display (LCD), or Light Emitting Diode (LED).

22. The apparatus of claim 1, wherein said apparatus *acts as an interface* between Internet signals and application products *by processing Internet signals in real-time and sending said processed Internet signals to said application products*.

23. A process for decoding and encoding network protocols and data, said process comprising the steps of:

providing a network protocol layer module for receiving and transmitting network packets and for encoding and decoding network packet*s* [bytes] which comprise packet data;

providing a data handler module for exchanging said packet data with said network protocol layer module and for processing [a] *at least one* specific data type *or protocol*;

providing a memory control module in communication with said data handler module for arbitrating memory accesses [and for providing display data]; and providing [an operating system (o.s.)] *at least one* state machine module that is [implemented in hardware and that is] optimized for a single selected network protocol, said [o.s.] *at least one state machine* module in communication with said data handler module [and providing resource control and system and user interfaces];

wherein said network protocol layer module, said data handler module, said memory control module, and said [operating system (o.s.)] *at least one* state machine module *comprise corresponding dedicated hardware structures that* are implemented in [hardware] gate level circuitry.

24. The process of claim 23, wherein said [step of encoding and decoding network packet bytes] *network protocol layer module* further comprises the step of:

representing different network protocol[s] *stacks* using a plurality of state machines.

25. The process of claim 24, wherein said [step of encoding and decoding network packet bytes] *network protocol layer module* further comprises the step of:

encoding and decoding one or more of the following network protocols: Point to Point Protocol (PPP), Internetwork Packet (IP), Transmission Control Protocol (TCP), Raw Socket, and/or User Datagram Protocol (UDP).

26. The process of claim 23, wherein *said network protocol layer module* [step of encoding and decoding network packet bytes] further comprises the step of:

processing network packet*s* [bytes] in real time.

27. The process of claim 23, wherein said [step of encoding and decoding network packet bytes] *network protocol layer module* further comprises the step of:

processing network packet*s* [bytes] concurrently.

28. The process of claim 23, wherein said [step of encoding and decoding network packet bytes] *network protocol layer module* further comprise the step*s* of:

processing network [packet bytes] *packets* in a [byte] serial fashion.

29. The process of claim 23, wherein said [step of processing packet data bytes] *data handler module* further comprises the step of:

processing specific data type(s) using at least one state machine.

30. The process of claim 29, wherein said [step of processing packet data bytes] *data handler module* further comprises the step of:

use of a CRC algorithm to decode data fields.

31. The process of claim 29, wherein said [step of processing packet data bytes] *data handler module* further comprises the step of:

processing one or more of the following protocols: Hypertext Transfer Protocol (HTTP), Hypertext Markup Language (HTML), Post Office Protocol (POP3), Internet Message Access Protocol (IMAP4), Simple Mail Transfer Protocol (SMTP), Joint Photographic Experts Group (JPEG), Graphics Interchange Format (GIF), and/or Java language.

32. The process of claim 29, wherein said [step of processing packet data bytes] *data handler module* further comprises the step of:

processing packet data [bytes] in real time.

33. The process of claim 29, wherein said [step of processing packet data bytes] *data handler module* further comprises the step of:

processing packet data [bytes] concurrently.

34. The process of claim 29, wherein said [step of processing packet data bytes] *data handler module* further comprises the step of:

processing packet data [bytes] in a [byte] serial fashion.

35. The process of claim 29, wherein said [step of processing packet data bytes] *data handler module* further comprises the step of:

placing any data more than once by a specific one of said at least one state machine in a specific memory location with a pointer designating said memory location.

36. The process of claim 23, wherein said [step of controlling memory accesses further comprises the step of:] *memory control module* arbitrat[ing]*es* all memory accesses.

37. The process of claim 23, wherein said [step of controlling memory accesses further comprises the step of:] *memory control module* allow[ing]*s* a system memory and a video memory to reside in a same memory area using a Unified Memory Architecture (UMA).

38. The process of claim 23, [wherein said step of controlling state machine sequencing] further compris[es]*ing* the step of:

arbitrating between said [step of encoding and decoding network packet bytes] *network protocol layer module*, said [step of processing packet data bytes] *data handler module*, and said [step of controlling memory accesses] *memory control module* for resource control, system and user interface.

39. The process of claim 23, [wherein said step of controlling state machine sequencing] further compris[es]*ing* the step of:

interpreting system and user input for the purpose of controlling data handler modules and network protocol layer modules.

40. The process of claim 23, further comprising the step of:

displaying output data.

41. The process of claim 40, wherein said step of displaying output data further comprises the step of:

controlling one of the following types of displays: VGA, television, Liquid Crystal Display (LCD), or Light Emitting Diode (LED).

42. The process of claim 23, wherein said process is used to implement an interface between Internet signals and application products *by processing Internet signals in real-time and sending said processed Internet signals to said application products*.

*43. The apparatus of claim 1, wherein said memory control module provides display data.*

*44. The process of claim 23, wherein said memory control module provides display data.*

* * * * *

UNITED STATES PATENT AND TRADEMARK OFFICE

CERTIFICATE OF CORRECTION

PATENT NO. : RE 39,501 E
APPLICATION NO. : 10/093340
DATED : March 6, 2007
INVENTOR(S) : Minami et al.

It is certified that error appears in the above-identified patent and that said Letters Patent is hereby corrected as shown below:

In the specification: Col. 1, Line 3,

Please insert the following paragraph after the title of the invention on page 1 as follows:

--Related Application(s)

The present application is a reissue of U.S. Application No. 08/742,085 filed on 10/31/1996 now U.S. Pat. (6,034,963); and is also related to U.S. Application number 10/862,125 filed on 6/4/2004 (pending).--

Signed and Sealed this

Seventh Day of September, 2010

David J. Kappos

David J. Kappos
*Director of the United States Patent and Trademark Office*